July 12, 1932. H. C. BROWN 1,866,837
CHAIN, METHOD, AND METHOD OF WELDING
Filed April 30, 1930 4 Sheets-Sheet 1
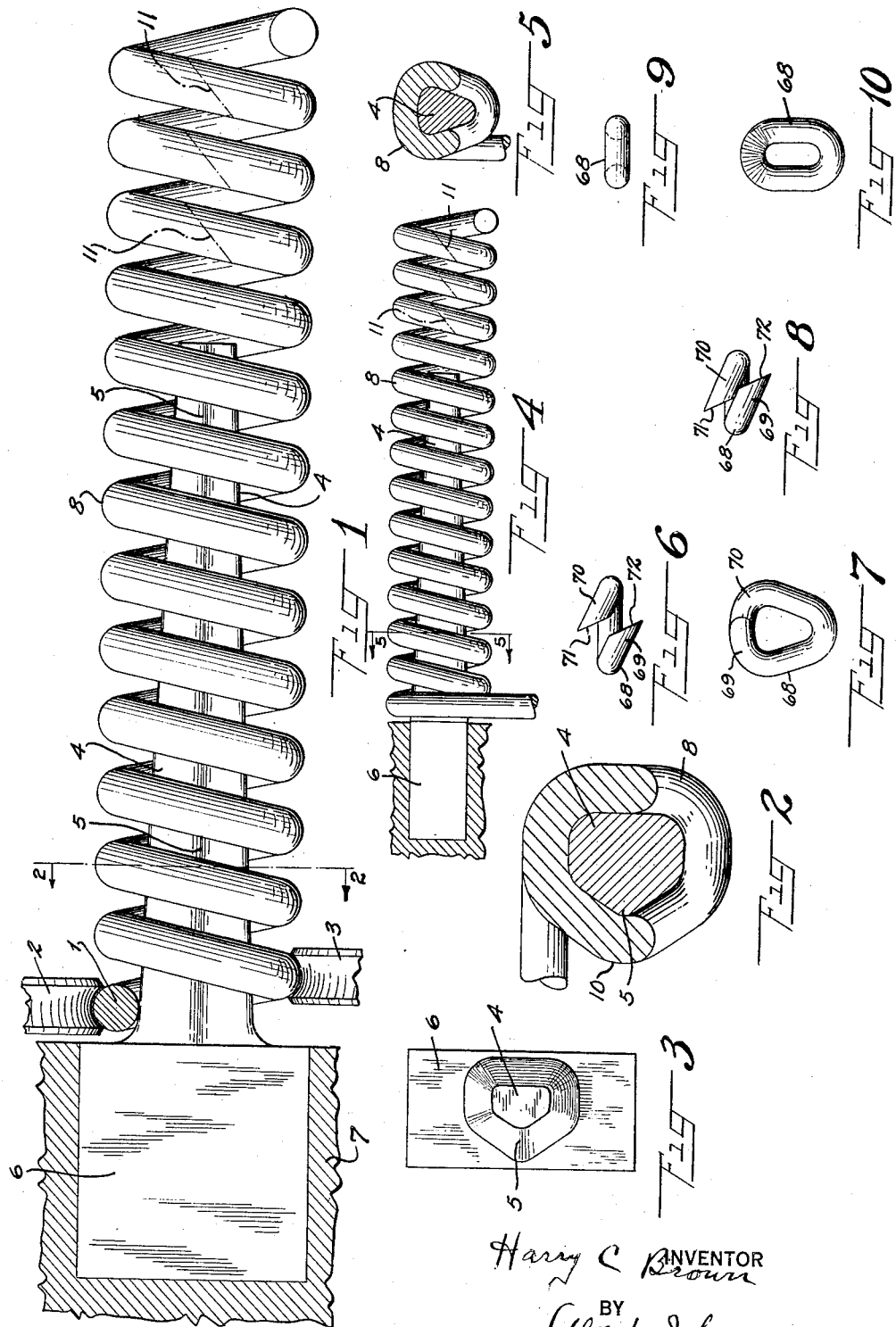

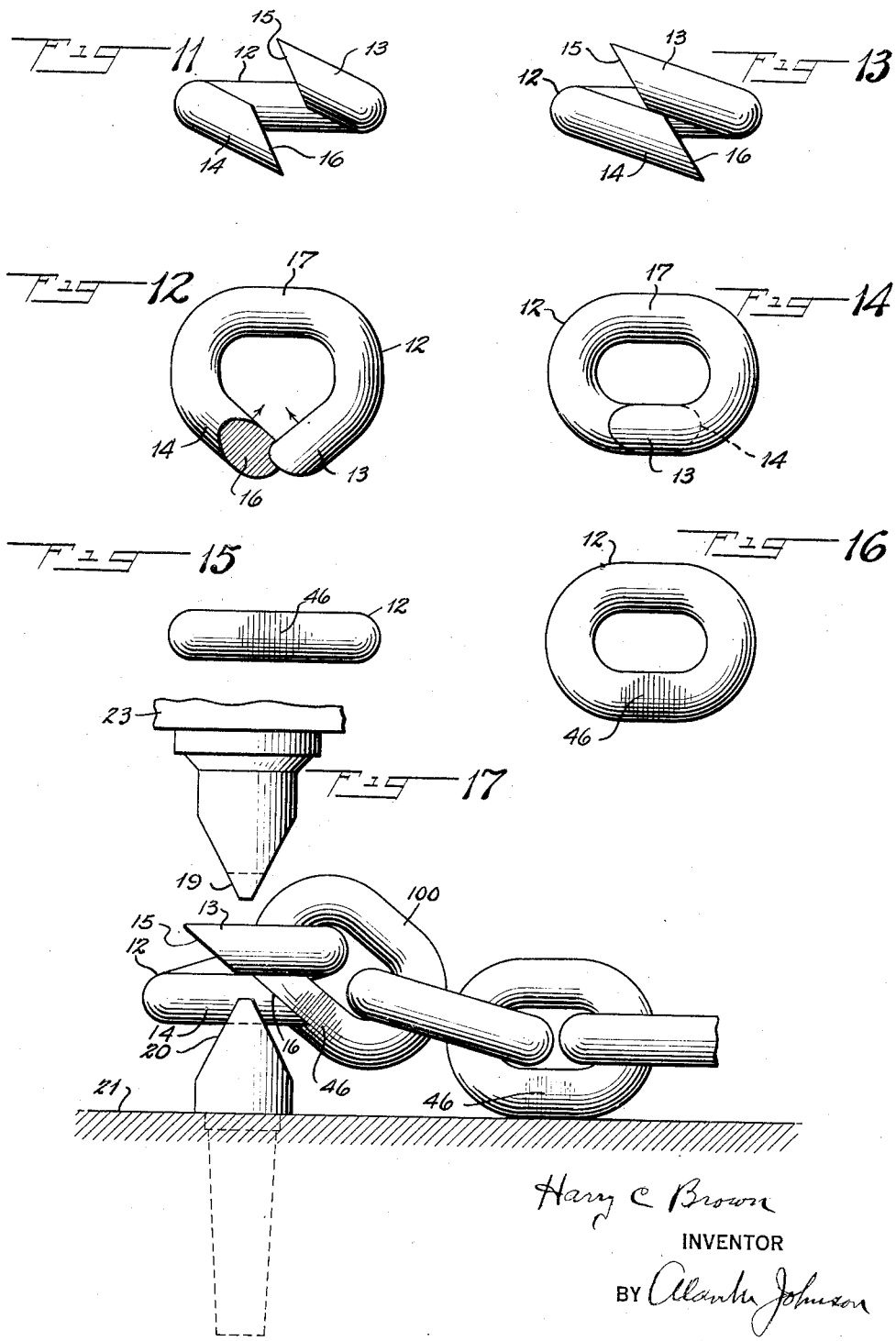

July 12, 1932.  H. C. BROWN  1,866,837
CHAIN, METHOD, AND METHOD OF WELDING
Filed April 30, 1930    4 Sheets-Sheet 3
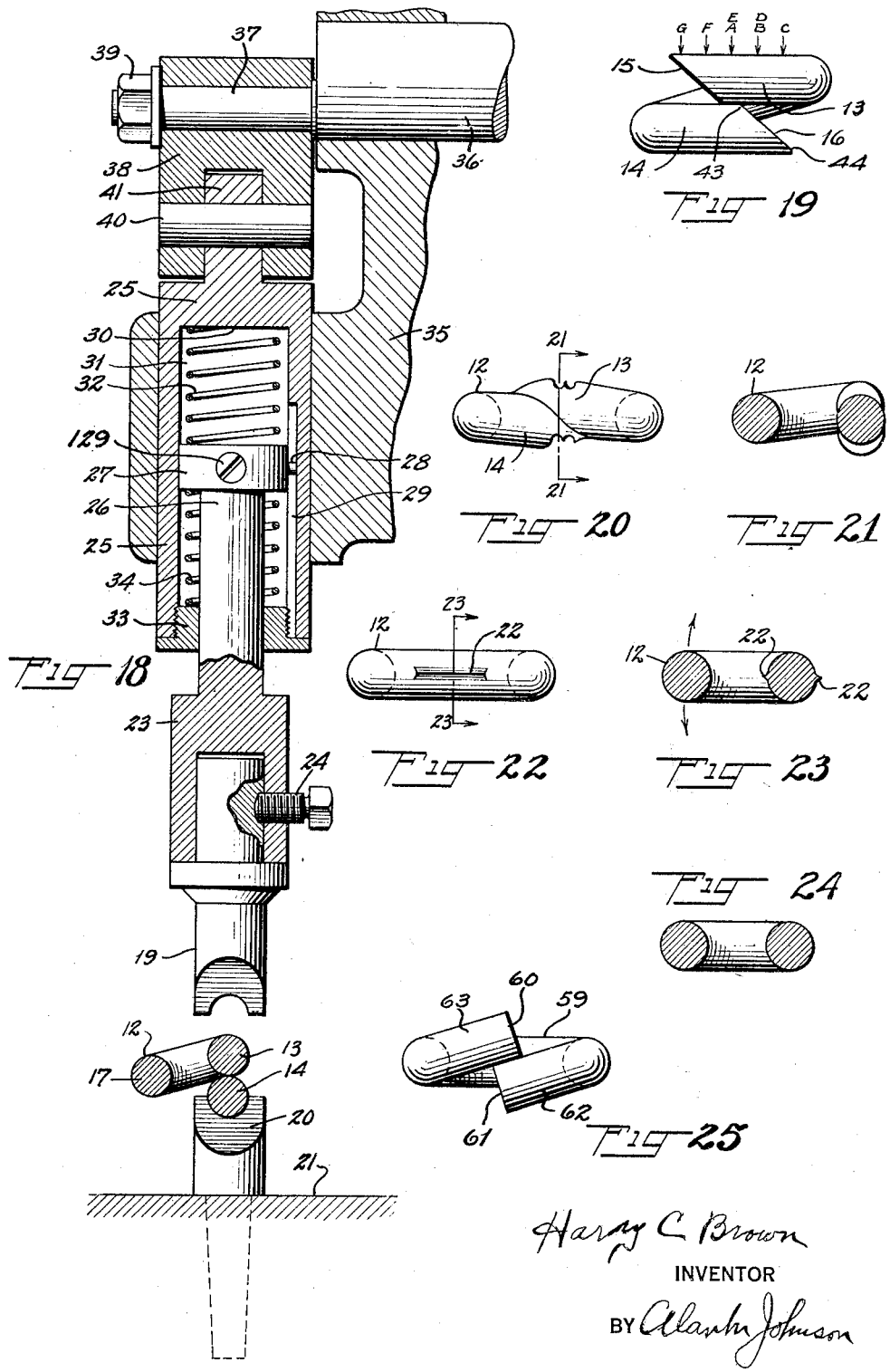
Harry C. Brown
INVENTOR
BY Alanh Johnson
ATTORNEY

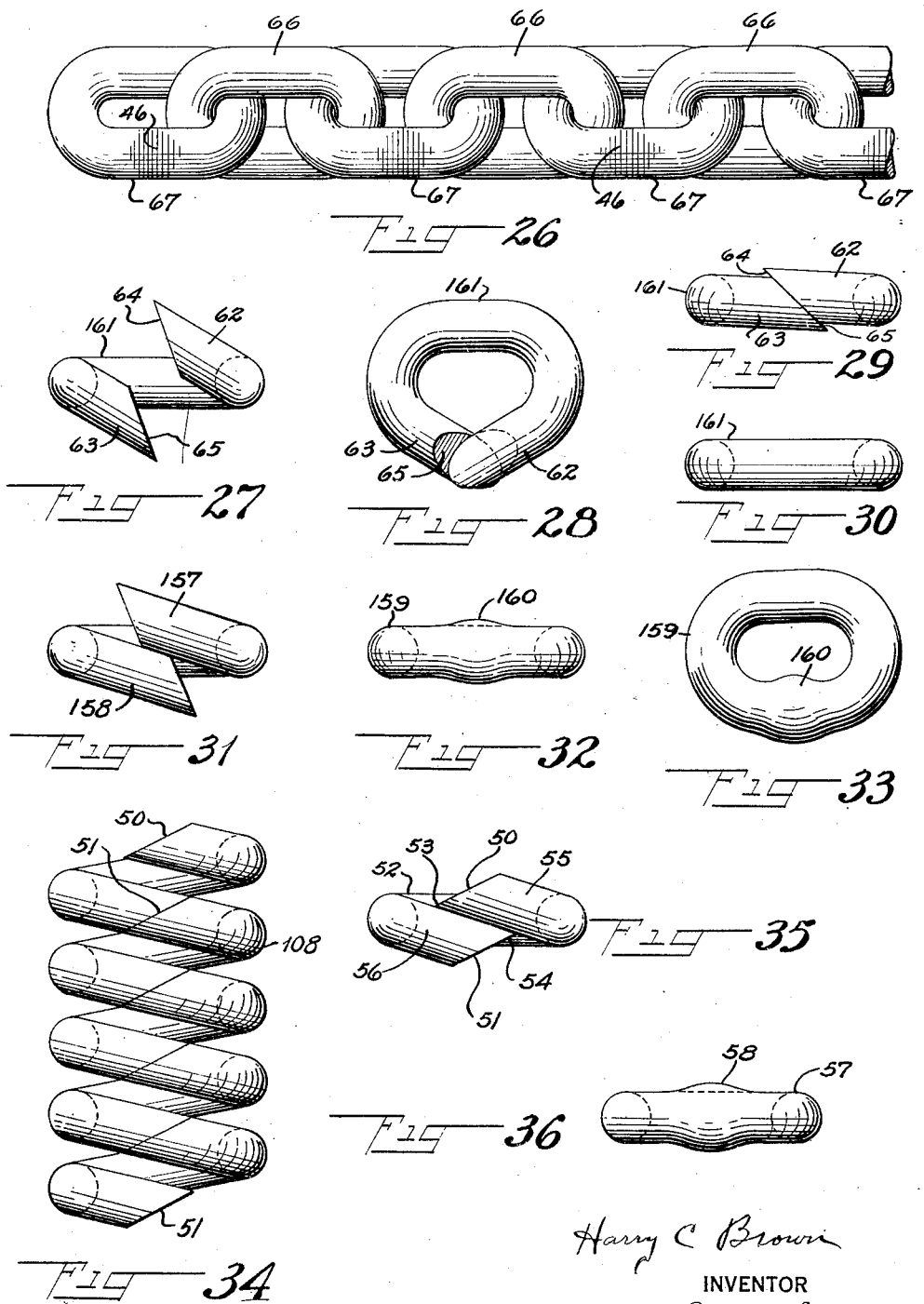

Patented July 12, 1932

1,866,837

UNITED STATES PATENT OFFICE

HARRY C. BROWN, OF WESTWOOD, NEW JERSEY, ASSIGNOR TO HENRY B. NEWHALL CORPORATION, OF GARWOOD, NEW JERSEY, A CORPORATION OF NEW JERSEY

CHAIN, METHOD, AND METHOD OF WELDING

Application filed April 30, 1930. Serial No. 448,578.

My invention relates to chain, the method of manufacturing it, and a method of welding.

It further relates to a welded chain, the metal of the weld not having been heated to such an extent as to change the molecular, or granular, or grain structure, as is commonly done in electric welding. It relates, therefore, more particularly to obtaining the required welding heat by fire, though the required welding heat may be obtained by an electric current, provided the temperature is kept down to that required for welding (not electric welding), and which will not change the molecular, granular, fibrous, or grain structure of the metal welded.

My invention further relates to a method of welding in which the welding area is subjected to pressure of forming implements, acting at any one time, on only a fractional portion of the welding area. And, preferably, progressively which will progressively weld the surfaces together, this action, for brevity, is referred to in this application as "knitting" the parts together.

My invention further relates to the method of forcing or extruding substantially all foreign matter from the weld, thereby increasing the strength of the weld.

My invention further relates to the method of manufacturing welded chain, and more particularly to side welded chain, though a link having an end weld may be "knitted" together as previously and hereinafter described.

My invention further relates to a chain, as a new article of manufacture, made by my improved method.

My invention further relates to certain methods of manufacture, sub-methods of manufacture, welded articles, chains and details, all of which will be more fully hereinafter described and pointed out in the claims.

In the drawings I have shown one form of apparatus whereby my method may be carried out and the welded chain manufactured, but of course, it is to be understood that my invention is not to be confined to this particular apparatus shown by way of illustration.

Figure 1 is a side elevation of a standard form of chain making machine, with the exception of my new form of mandrel, to make side welded chain.

Figure 2 is a cross section on line 2—2 of Figure 1.

Figure 3 is an end view of my improved mandrel.

Figure 4 is a plan view of a modification.

Figure 5 is a section on line 5—5 of Figure 4, turned 90° clockwise from the position of Figure 4, looking in the direction of the arrows.

Figures 4 to 10 inclusive illustrate a modification. Figure 6 is an end view showing an open link, adapted to be welded on the end of a link rather than on the side as shown in Figure 2.

Figure 7 is a plan view of Figure 6.

Figure 8 is an end view, showing the ends of the link about to be welded.

Figure 9 is an end view of the finished link having an end weld.

Figure 10 is a plan view of Figure 9.

Figures 11 to 36 inclusive illustrate links welded on the side of the link. Figure 11 is a side elevation.

Figure 12 is a plan view of Figure 11; the arrows illustrate the movement of the open ends of the link, when they are brought to a welding heat and pressed against a bench or stop.

Figure 13 is a side elevation of the link after the open heated ends have been pressed against a bench or stop.

Figure 14 is a plan of Figure 13.

Figure 15 is a side elevation of the completed link after welding.

Figure 16 is a plan of Figure 15, showing the completed link, the side weld showing ripples caused by the small hammer die, or other shaping or welding tool.

Figure 17 is a fragmentary side elevation of one form of apparatus which may be used to carry out my improved method.

Figure 18 is a vertical section through one form of apparatus which may be used to carry out my improved method.

Figure 19 is a side elevation of a link about to be welded.

Figure 20 is a side elevation showing the weld about half finished.

Figure 21 is a section on line 21—21 of Figure 20, looking in the direction of the arrows.

Figure 22 is a side elevation of the welded link, showing it provided with fins.

Figure 23 is a section on line 23—23 of Figure 22, the arrows illustrating the direction that the link is rocked or moved between the hammer die and the anvil die so that they will eliminate these fins.

Figure 24 is a vertical section, similar to Figure 23 of the completed link, the fins being eliminated by being hammered or forced into the weld.

Figure 25 is a side elevation of a modification in which the side of the link is cut to provide squared ends, rather than scarfed ends as in Figure 19.

Figure 26 is a side elevation of a modified form of chain having alternate solid forged links and side welded links.

Figures 27 to 30 inclusive show another modification in which the mandrel is so shaped as to get no overlap of the open side portion, requiring the scarf surfaces to be welded together. Figure 27 is a side elevation.

Figure 28 is a plan.

Figure 29 is a side elevation showing the scarfed ends brought together ready for welding.

Figure 30 is a side elevation of the finished side welded link.

Figures 31 to 33 inclusive illustrate a modification in which the mandrel is so shaped as to cause an excessive overlap on the side of the link, and a swell in the completed link. Figure 31 is a side elevation.

Figure 32 is a side elevation of the completed link showing the swell on the side of the link formed by modified hammer and anvil dies not shown.

Figure 33 is a plan view.

Figures 34 to 36 inclusive illustrate another modification in which the cut is in the opposite direction from Figure 1 to insure that the heated tips of the scarfed surfaces will be immediately heat protected by the adjacent heated side of the link, preventing their chilling before being completely welded. Figure 34 is a side view of a coil formed by the chain machine.

Figure 35 is a side elevation of a link showing the ends of the scarves in contact with the adjacent heated side of the link.

Figure 36 is a side elevation of the completed link formed by hammer and anvil dies.

Prior to my invention it was old to weld chain by means of dies or hammers that substantially covered the area of the weld. Pressure on such hammers or dies caused foreign matter, such as cinders, iron oxide, dirt, or other foreign matter, to be caught and held or occluded in the weld, thereby materially reducing the strength of the weld. If the part welded was a link of a chain the tensile strength of the chain could never be accurately forecast, because these impurities, which vary in different welds, materially reduce the tensile strength of the chain; the chain, of course, being only as strong as the strength of the foulest and poorest weld.

In my invention I overcome this difficulty and form each weld with substantially no occluded foreign matter. In a chain this will be true whether the weld is on the side of the link, or on the end of the link.

In chain making, it has been impossible to make comparatively small chain with a side fire weld, because with the adjacent completed link hooked into the incompleted link there was not room enough to work the welding dies or hammers. This necessitated that such chain be welded on the end of the links. This made the weld, which is the weakest part of the link, come on the end of the link, directly in line with the tensile strains thrown on the chain. It is clear that if the weld can be formed in the side of the link, without deteriorating the molecular, granular, fibrous, or grain structure of the metal, that a stronger chain will be formed, because the weld would only be subjected to one-half of the tensile strain thrown on the link, the other half being taken by the unwelded side of the link.

Attempts have been made to make high grade chain that will sustain sudden shocks, by electric welding the sides of the links, but they have not been successful because the metal of the link is heated to such a high temperature as to change the molecular, or granular, or fibrous, or grain structure of the metal as to materially weaken it, and to render the chain unfit for the purpose intended. Attempts have been made to reheat and anneal such electric welded links but with no success comparable with a fire weld, where the metal is not heated to such a degree as to change its molecular, or granular, or fibrous, or grain structure.

By my invention I can make a fire side welded chain at greater speed, and at less cost, than the old end welded chain can be made. One chain maker, with no assistant, can make more and a better grade of chain of higher and more uniform tensile strength, than two men can make by the old method.

By my invention, also, one welding heat is preferably, though not necessarily, employed without the need of reheating.

I also perform the welding operation without the shaping tool remaining in contact with the surface being welded, so that the welding heat will not be reduced by transfer of heat with the shaping tools, which, in the present practice requires the article being weld to be reheated with the consequent delay and increased cost of labor.

In the accompanying drawings one form of apparatus is illustrated to carry out my method but it is, of course, to be understood that I am not to be limited to this or any other particular form of apparatus to carry out my improved method.

A bar of iron or steel stock 1, Figure 1 is fed to the chain making machine and is pressed by the rollers 2 and 3 on the rotating mandrel in the usual operation of forming a coil, prior to cutting the coil to form a plurality of open links. In the old practice the coil was so formed as to permit the chain links to be cut on the end of each link, which were subsequently welded on the end, with the disadvantages previously described.

In my invention I employ a different shaped mandrel 4 which is provided with a horn 5, on the side of the mandrel, which is tapered permitting different sizes of links to be formed on different portions of the mandrel, as well as permitting the coil to be easily worked off the mandrel. The mandrel has a base 6 which is securely held in the fixed portion 7 of the chain making machine.

The bar of iron or steel stock 1 is fed to the chain making machine Figure 1, forming the coil 8, Figures 1 and 4, and is progressively forced off the tapered mandrel 4.

The horn 5 forms a bowed portion 10 in the coil 8. This bowed portion is cut, in any suitable manner, either to form scarves 11, 11, Figures 1, 4, 11 and 13; or oppositely inclined scarves Figures 34, 35; or cut with squared ends Figure 25; or otherwise cut to form open side chain links.

When the stock is round, as is usual, my open side link 12, Figure 11, will be formed with two open side members 13 and 14, and with the scarf surfaces 15 and 16.

The open ends 13 and 14 are now brought to a welding heat, preferably in a fire to make a fire weld. By aid of suitable pliers the chain maker then grasps the closed side 17 of the link and presses the two open ends 13 and 14 gently but firmly against a stop, as for example, a bench, to cause the open ends 13 and 14 to move towards the closed side 17 and over each other, more or less, depending upon the shape of the horn 5 on the mandrel 4. This will bring the ends into the position illustrated in Figure 13.

The open ends 13 and 14 while at the welding heat, and preferably without any reheating, are then subjected to pressure, the pressure being applied, at any one time, to only a fractional portion of the surface to be welded. This pressure is preferably applied progressively to the welded area to extrude substantially all foreign matter, such as cinders, iron oxide, dirt, or other foreign matter from the welded surface, thereby "knitting" the welding surfaces together forming the strongest possible weld, without changing the molecular, or granular, or fibrous, or grain structure of the metal welded.

This may be done in various ways. I have shown in Figures 17 and 18 one manner of performing this "knitting" operation. A hammer die 19, of the minimum area, and smaller than the total area to be welded, is mounted to reciprocate at high speed over and in co-operation with a similar fixed anvil die 20 fast to a bench or solid support 21. The anvil die 20 is likewise of the minimum area and smaller than the total area to be welded. The hammer die 19 may or may not touch the anvil die 20, there being usually a slight clearance, which will form the fins 22, 22 on the welded link, Figures 22 and 23.

The hammer die 19 is reciprocated at great speed to give a great number of blows on the surface to be welded. In the present hand welding, by a chain maker and his assistant, there are probably not over one hundred blows delivered per minute, if that many. In my improved method the number of blows given are preferably very great. Preferably they are given at such a rate that the weld is completed on one welding heat, without reheating. While I do not intend to limit my improved process to any particular number of blows of the hammer die per minute it is sufficient if the hammer die is of comparatively small area, compared to the total area to be welded, and gives a great number of blows on the welded area so that the link has to be moved under the rapidly reciprocating hammer die to cover the entire welded area. I have had excellent results with a hammer die striking about twelve hundred to eighteen hundred blows per minute, and even more.

This hammer die 19 may be operated in any suitable manner. In Figure 18 I have shown it held in a reciprocating arm 23 by means of a set screw 24. The other end of this arm 23 is mounted in a hollow reciprocating arm 25. On the end 26 of the arm 23 is mounted a collar 27 provided with a pin 28 sliding in a vertical slot 29 in the hollow reciprocating arm 25. The sleeve 27 is held to the end 26 by means of a set screw 29. Between the collar 27 and the top 30 of the chamber 31 is mounted a cushioning spring 32. Below the collar 27 and above the closing plug 33 is mounted a recoil spring 34. The pin 28, sliding in the vertical groove 29, insures that the hammer die 19 will always be in exact alignment with the anvil die 20. The hollow arm 25 reciprocates in a fixed bracket 35 in which is rotatably mounted a drive shaft 36 adapted to be rotated at high speed. Mounted eccentrically on the end of this shaft is the pin 37, passing through an opening in the pitman 38. A nut 39 prevents accidental disengagement of the pin 37 and pitman. A wrist pin 40 connects the pitman with the reduced head 41 of the hollow reciprocating arm 25.

The open side link, Figure 11, being brought to a welding heat is then hooked into the last finished link 100, Figure 17, when the ends 13 and 14 are pressed against a stop to cause the open ends 13 and 14 to move, in the direction of the arrows of Figure 12, to close the gap and assume the position of Figure 13. The ends are then brought into position between the fixed anvil die 20 and the movable hammer die 19. The chain maker then steps on a treadle (not shown) to actuate the rotary drive shaft 36, Figure 18. This will cause the hammer die 19, of relative small area, and adapted to work within the link, to give a great number of blows on the welded area, the link being moved under the hammer die 19 by the chain maker to weld the two ends 13 and 14 together and present different portions of the welded area to the hammer die. This insures that the ends 13 and 14 are progressively welded, or "knitted" together, forcing out or extruding substantially all cinders, iron oxide, dirt or other impurities from the weld.

In welding, the link is preferably presented to the hammer die, Figure 18, so that the hammer die 19 operating at great speed, would first strike approximately at the point marked A (Figure 19), then to positions B and C successively. This will cause the scarf surface 16 to be progressively welded or "knitted" to the adjacent side 13 of the link from the point 43 to the end of the scarf 44.

As the surface 16 is thus progressively welded substantially all foreign matter as cinders, iron oxide, dirt, or other foreign matter, will be forced along the surface 16 ahead of the part just welded or knitted by the hammer die 19, until substantially all such foreign matter will be extruded by the time the hammer die 19 reaches the position marked C. When the hammer die reaches this position the end 44 of the scarf 16 will have been welded to the adjacent side 13 of the link. The link is then moved back and, as this is done, the hammer die will strike substantially at positions D and E, which are substantially the same as positions B and A respectively. Further movement of the link will then cause the hammer die 19 to strike positions marked F and G, which will cause the scarf surface 15 to be welded or knitted to the adjacent portion 14 of the link in the same manner just described for the scarf surface 16, forming a complete closed welded link as shown in Figures 22 and 23 with the fins 22 and 22. By slightly rocking the link between the hammer die 19 and the anvil die 20, as indicated by the arrows in Figure 23, these fins 22, 22 will be welded into the body of the link, forming a smooth link as illustrated in Figure 24.

Of course, in actual operation all this is done by the chain maker, without the aid of an assistant, in one welding heat and much faster than it is possible to describe the operation.

It is desirable, though not absolutely essential, that the hammer die be removed from the weld after each blow. This prevents the loss of the welding heat which would result from the hammer die remaining in contact with the welded area. The recoil spring 34 as well as the eccentric pin 37 lifts the hammer die from the welded area and will prevent this loss of heat. Then, too, the area of the hammer die, compared to the total area to be welded, is comparatively small so that even on the hammer stroke a relatively small area of cold metal is presented to the welded area.

The finished link 12 will have a side weld distinguishable by more or less faint ripples 46, Figure 16, the ripples being the marks of the hammer and anvil dies. This will be a distinguishing and identifying mark indicating a side weld and the mode of manufacture.

In some cases I may form a coil 108, Figure 34, which is substantially the same as coil 8, except I form the cut or scarf surfaces 50 and 51 at an opposite angle from the scarf surfaces 15 and 16 of Figures 1 and 19.

When the coil is cut to form the open links 52, Figure 35, the operation of welding or "knitting" the parts together is just the same as previously described. In this form, however, the tip 53 of the scarf 50 is brought immediately into contact with the hot end 56 of the link, while the other tip 54 of the scarf 51, is brought at the same time into contact with the hot end 55 of the link, the welding heat of the ends 55 and 56 serving to prevent the tips 54 and 53 cooling below the welding heat, as they might do if not prevented by the heat of these larger portions of metal. After welding or knitting the parts together, as previously described, a link 57 is formed having a slight bulge 58, which, however, may be worked down by the hammer and anvil dies, if desired. In some cases I may form a link 59, Figure 25, with squared ends 60, 61 instead of scarfed ends. The sides 62, 63 are welded or knitted together the same as described for the other forms.

In some cases I may form my mandrel with a different contour from that of mandrel 4, Figure 1, so as to give an excessive overlap of the ends 157 and 158, Figure 31. These ends are welded and knitted together as described for the other forms, and will form a side welded link 159 with a distinguishing or identifying bulge 160, Figures 32 and 33, in addition to the identifying ripples formed by the hammer and anvil dies.

In some cases I form the mandrel so that there will be no overlap of the sides of the links. In Figures 27 to 30 I have shown a modification in which the link 161 is formed with open side members 62, 63 having scarf surfaces 64 and 65. When this link is brought to welding heat and pressed against a stop the ends 62 and 63 will not overlap, but on the contrary the scarf surfaces 64 and 65 will be brought into contact with each other, Figure 29. The side of this link 161 is welded or knitted together as in the other forms making a finished link 161 Figure 30.

In some cases I may form a chain of a plurality of forged solid links 66, 66 joined together by any one of my side welded links 67, 67 welded or knitted together as previously described.

While I preferably form my progressive welding or knitting on the side of a link, for the reasons previously described, it is equally applicable to an end welded chain, because by extruding or forcing out from the weld substantially all cinders, dirt, iron oxide or other foreign matter, the link, even though end welded, is proved to be much stronger than an end welded link, welded by the old method now employed.

In Figures 4 to 10 I have shown my improved method of welding applied to an end welded link. A different shaped mandrel is employed. The links 68, Figure 6, are cut on the end of the link forming two end members 69 and 70 with the scarf surfaces 71 and 72. When the link is heated to a welding heat the ends 69 and 70 are pressed against a stop to cause the ends 69 and 70 to overlap each other as shown in Figure 8. The ends 69 and 70 are then welded or knitted together progressively to extrude substantially all cinders, iron oxide, dirt, and other foreign matter, exactly as described for welding the side links, forming a finished end welded link 68 as shown in Figure 10 with identifying ripples on the end of the link, rather than on the side, as on the other forms.

Having thus described this invention in connection with illustrative embodiments thereof, to the details of which I do not desire to be limited, what is claimed as new and what is desired to secure by Letters Patent is set forth in the appended claims.

What I claim is:

1. The process of manufacturing chain consisting in forming an open link, heating the link to a welding heat, and progressively welding or knitting the open portions of the link by a plurality of progressive blows each delivered over a comparatively small area of the welded surface, thereby extruding and forcing out of the weld substantially all foreign matter and impurities and increasing the strength of weld.

2. The process of manufacturing chain consisting in forming a link with an open side having scarves, heating the link to a welding heat without changing its molecular, or granular, or grain structure, and welding the open side of the chain by bringing each scarf in contact with the opposite heated side of the link to prevent chilling of the scarves, and subjecting the welding surfaces on the open side of the link to a plurality of quick blows each blow being delivered over only a small portion of the surface of the weld, to weld or knit the side of the link together.

3. The process of manufacturing chain consisting in forming a link with an open side, heating the open side to a welding heat without changing its molecular, or granular, or grain structure, and progressively subjecting the welding surface to a plurality of quick blows, each blow extending over only a fraction of the welded surface, to progressively knit or weld the side of the chain, and at the same time progressively extrude substantially all foreign matter and impurities from the weld, thereby increasing the strength of the weld.

4. The process of manufacturing chain consisting in bending a piece of stock to form a coil each convolution of the coil having a protruding side portion, cutting the protruding side portion to form open side links, heating the open side of the link to a welding heat without changing is molecular, or granular, or grain structure, pressing the two open ends of the link so that they contact with each other, and subjecting the welding surfaces of the link to a plurality of quick blows each blow extending over a fraction of the welded surface to progressively knit and weld the open side of the link together and at the same time progressively extrude substantially all foreign matter and impurities from the weld thereby increasing the strength of the weld and the strength of the chain.

5. The process of manufacturing chain consisting in bending a piece of stock to form a coil each convolution of the coil having a protruding side portion, cutting the protruding side portion to form open side links with scarves, heating the open side of the link to a welding heat without changing its molecular, or granular, or grain structure, pressing the two open ends of the link so that they overlap, bringing each scarf into contact with the opposite end of the open link so that the heat of that end will prevent the end of the scarf from becoming chilled, and subjecting the welding surfaces of the link to a plurality of quick blows each blow extending over a fraction of the welded surface, to progressively knit and weld the open side of the link together and at the same time progressively extrude substantially all foreign matter and impurities from the weld, thereby increasing the strength of the weld and the strength of the chain.

6. The process of manufacturing chain in continuous lengths consisting in forming an open link, fire heating the ends of the link to a welding heat but not to such a heat as to change the molecular or granular, or grain structure of the metal, hooking the heated ends of the open link into a previously formed closed link, and welding the open ends of the link by a plurality of blows, each delivered progressively over a comparatively small area and while the open link is hooked into the adjacent finished link, thereby forming a complete continuous welded chain link by link, in which the welds will be of maximum strength.

7. A new article of manufacture comprising a chain having welded links, the metal of the weld being of the same molecular, or granular, or grain structure as the rest of the links, and the welded portion of each link being welded progressively so that the weld will be substantially free of impurities, thereby increasing the strength of the weld and of the chain.

8. The process of welding consisting in heating the metal to be welded to a welding heat, and subjecting the metal while at the welding heat to a plurality of quick blows, each blow being delivered progressively over only a small portion of the surface of the weld, to progressively weld or knit the parts together, and at the same time progressively extrude and force out substantially all foreign matter and impurities from the weld thereby increasing the strength of the weld.

9. The process of welding consisting in heating the metal to be welded to a welding heat but not to a heat which changes the molecular, or granular, or grain structure of the metal and subjecting the metal while at this welding heat to a plurality of quick blows, each blow being delivered progressively over only a small portion of the surface of the weld, to progressively weld or knit the parts together, and at the same time progressively extrude and force out substantially all foreign matter and impurities from the weld thereby increasing the strength of the weld without changing the molecular, or granular, or grain structure of the metal.

10. The process of welding consisting in heating two ends of metal stock in a fire until a welding heat is obtained, and then progressively welding the two heated ends together by a plurality of rapid blows each blow being progressively delivered over only a fraction of the welded surface said blows being all delivered during the welding heat thereby extruding and forcing out of the weld substantially all foreign matter and impurities.

11. The process of welding consisting in heating the metal to be welded to a welding heat, and subjecting it at the welding heat to a plurality of blows of a tool of relatively small area, compared to the welded area, and after each blow of the tool removing it from the welded area so as not to reduce appreciably the welding heat of the metal.

12. The process of welding consisting in cutting a piece of metal stock to form scarfed ends, heating the metal including the scarfed ends to a welding heat, forcing the tips of the scarves into contact with the adjacent unscarved heated metal to keep the tips heated and to prevent the tips of the scarves cooling below the welding heat and welding the ends of the stock together and at the same time forcing and extruding substantially all foreign matter from the weld.

HARRY C. BROWN.